US012304040B1

(12) United States Patent
Westbrook

(10) Patent No.: US 12,304,040 B1
(45) Date of Patent: May 20, 2025

(54) PRESS TO FIT PIPE CONNECTOR TOOL

(71) Applicant: James Westbrook, Knoxville, TN (US)

(72) Inventor: James Westbrook, Knoxville, TN (US)

( * ) Notice: Subject to any disclaimer, the term of this patent is extended or adjusted under 35 U.S.C. 154(b) by 306 days.

(21) Appl. No.: 17/892,916

(22) Filed: Aug. 22, 2022

(51) Int. Cl.
*B25B 27/10* (2006.01)

(52) U.S. Cl.
CPC .................................... *B25B 27/10* (2013.01)

(58) Field of Classification Search
CPC ........... B25B 27/10; B25B 27/02; B25B 7/02; B25B 7/04; B25B 7/12; B25B 13/28
See application file for complete search history.

(56) References Cited

U.S. PATENT DOCUMENTS 4,571,808 A * 2/1986 King ....................... B25B 27/10 29/268
4,757,588 A * 7/1988 Churchich ............. B25B 27/10 29/268
5,537,727 A 7/1996 Mayer
11,247,260 B1 * 2/2022 Othman .................. B25B 27/10
2014/0373688 A1 * 12/2014 Scarpuzzi .............. A62C 37/20 29/428
2018/0264634 A1 * 9/2018 Yontz ...................... B25B 27/10
2019/0202040 A1 * 7/2019 Park ......................... B25B 27/10
2021/0086334 A1 * 3/2021 Burgess .................... B25B 7/12

* cited by examiner

*Primary Examiner* — C. A. Rivera
(74) *Attorney, Agent, or Firm* — Sanchelima & Associates, P.A.; Jesus Sanchelima; Christian Sanchelima

(57) ABSTRACT

A press to fit pipe connector tool including a handle assembly and a pressing assembly. The handle assembly includes a first tubular element and a second tubular element. The pressing mechanism includes a first pressing element and a second pressing element. Fitting can be engaged and held by the first pressing element and the second pressing element. The first pressing element and the second pressing element are attached to the first tubular element and the second tubular element defining a plier. The first tubular element and the second tubular element are close to couple the fitting on the first pressing element and the second pressing element together.

2 Claims, 3 Drawing Sheets

PRESS TO FIT PIPE CONNECTOR TOOL

BACKGROUND OF THE INVENTION

1. Field of the Invention

The present invention relates to a press to fit pipe connector tool and, more particularly, to a press to fit pipe connector tool that makes easier the process of fitting pipes by using a handheld tool.

2. Description of the Related Art

Several designs for connector tools have been designed in the past. None of them, however, include a securing element which allows to firmly hold a push to be inserted into the fitting.

Applicant believes that a related reference corresponds to U.S. Pat. No. 4,757,588 issued for a pair of push-on hose liners. Applicant believes that another related reference corresponds to U.S. Pat. No. 5,537,727 issued for a push to fit a connector tool comprising pliers with a pair of U-shaped fitting engaging attachments. None of these references, however, teach of a pair of pliers for connecting or disconnecting a push to connect fittings wherein the pliers have a pair of U-shaped fitting engaging members which in the open position will grip the distal end of each fitting and when the pliers are closed, will force the fitting together securely.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a press to fit pipe connector tool that includes a handle, the handle can be operated to make the connector tool to press the push to connect fitting and a pipe.

It is another object of this invention to provide a press to fit pipe connector tool that includes a first securing element to firmly hold a push to connect fitting.

It is still another object of the present invention to provide a press to fit pipe connector tool that includes a second securing element to firmly a pipe to be connected to the push.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
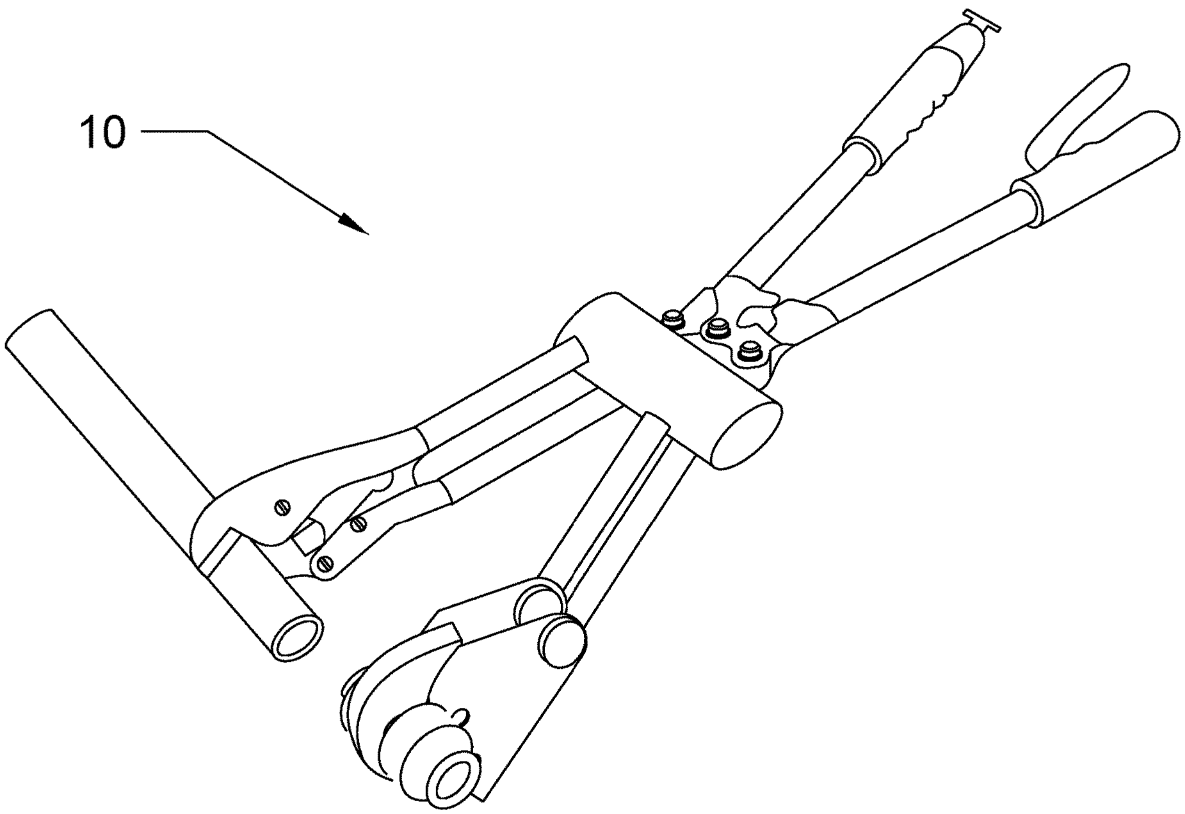
FIG. 1 represents an isometric operational view of the present invention 10.
Figure 2:
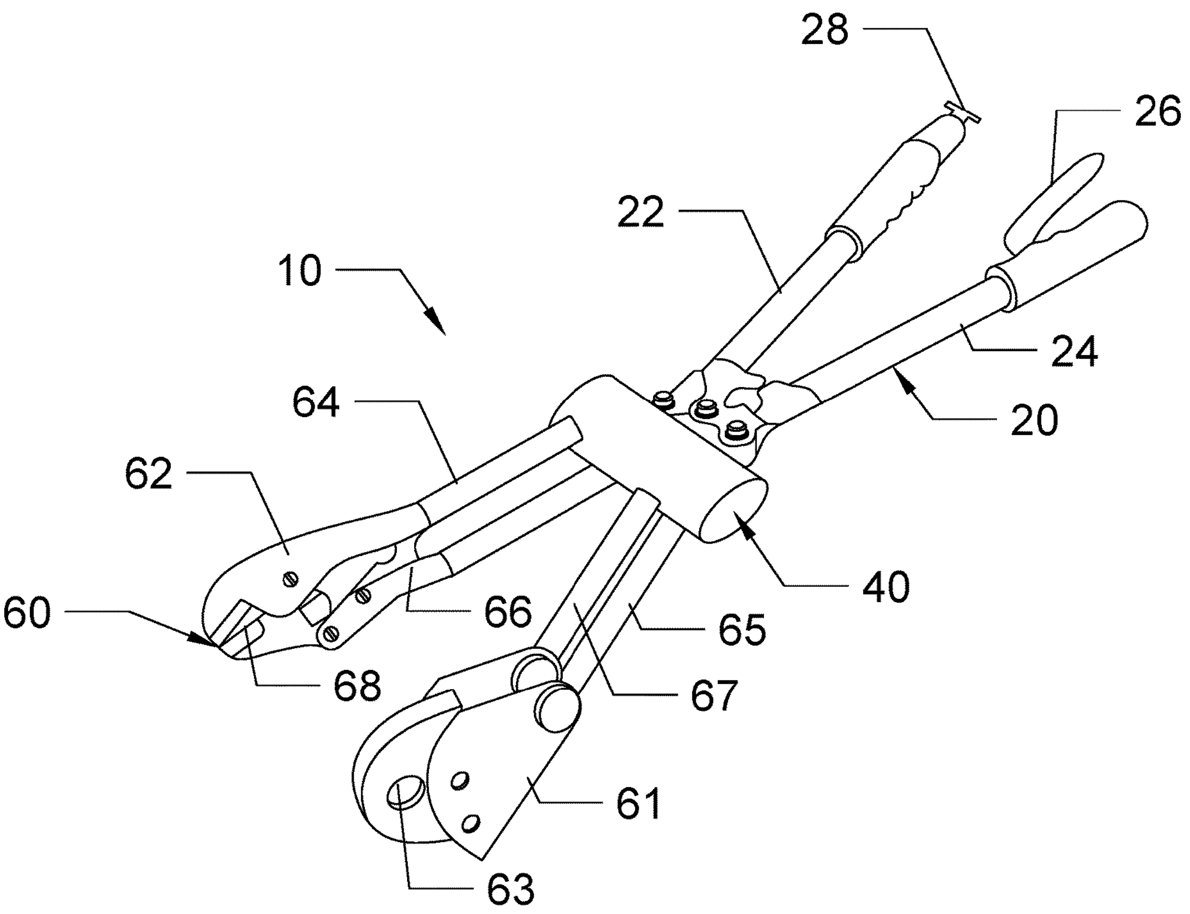
FIG. 2 shows an isometric view of the present invention 10.

Referring now to the drawings, where the present invention is generally referred to with numeral 10, it can be observed that it basically includes a handle assembly 20, a transmission mechanism assembly 40 and a pressing mechanism 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The handle assembly 20 may include a first tubular element 22, a second tubular element 24, an adjusting element 28 and a releasing element 26. The first tubular element 22 may have a cylindrical shape. It also may be suitable for the first tubular element 22 to have a rectangular shape, or any other suitable shape. The first tubular element 22 may be made of metal. It also may be suitable for the first tubular element 22 to be made of plastic, wood, or any other suitable material. The first tubular element 22 may have a proximal end and a distal end. The distal end of the first tubular element 22 may be suitable to have a rubber-covered or plastic-covered portion to hold the present invention 10. The distal end of the first tubular element 22 may have the adjusting element 28. The adjusting element 28 may rotate to adjust a predetermined element of the pressing mechanism 60.

The second tubular element 24 may have a cylindrical shape. It also may be suitable for second tubular element 24 to have a rectangular shape, or any other suitable shape. The second tubular element 24 may be made of metal. It also may be suitable for the second tubular element 24 to be made of plastic, wood, or any other suitable material. The second tubular element 24 may have a proximal end and a distal end. The distal end of the second tubular element 24 may be suitable to have a rubber-covered or plastic-covered portion to hold the present invention 10. The releasing element 26 may be attached to one of the sides of the distal end of the second tubular element 24. The releasing element 26 may be movable. The releasing element 26 may be made of plastic, metal, or any other suitable material. The releasing element 26 may be pushed or pulled from the second tubular element 24 to release an element of the pressing assembly 60. The proximal end of the first tubular element 22 and the proximal end of the second tubular element 24 may be connected to the transmission mechanism assembly 40.

Figure 3:
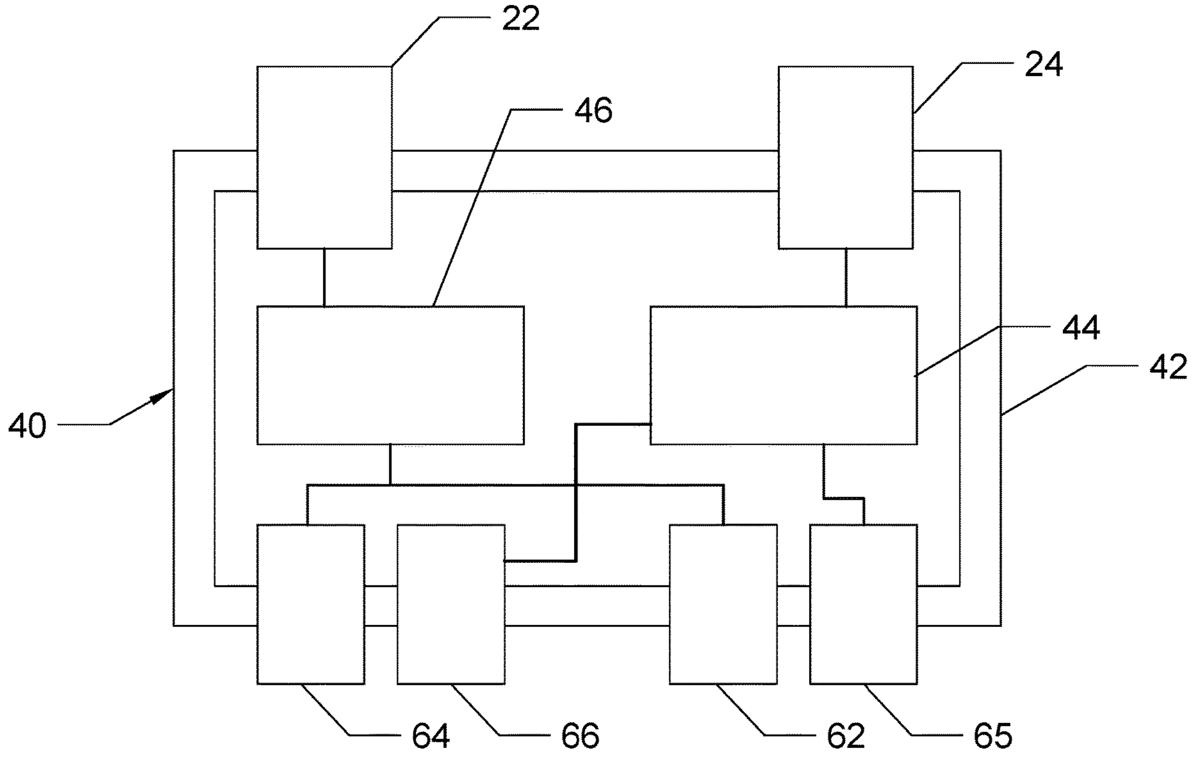
FIG. 3 is a schematic cross sectional view of the transmission mechanism assembly 40.

As best illustrated in FIG. 3 the transmission mechanism assembly 40 may include a housing 42 first transmitter 44 and a second transmitter 46. The housing 42 may have a rectangular shape, a cylindrical shape, or any other suitable shape. The housing 42 may be made of metal, plastic, or any other suitable material. The housing 42 may protect the elements inside of the transmission mechanism assembly 40. The transmission mechanism for the first transmitter 44 and the second transmitter 46 may be a mechanical transmission mechanism. The first transmitter 44 may be connected to the second tubular element 24. It also may be suitable for the first transmitter 44 to be connected to the first tubular element 22. The second transmitter 46 may be connected to the first tubular element 22. It also may be suitable for the second transmitter 46 to be connected to the second tubular element 24. The first tubular element 22 and the second tubular element 24 may be rotatably attached to the transmission mechanism assembly 40. The first tubular element 22 and the second tubular element 24 may move radially outwards with respect to the transmission mechanism assembly 40. Thus, the first tubular element 22 and the second tubular element 24 may define pliers which can be open and close. The first tubular element 22 and the second tubular element 22 may move radially inwards with respect to the transmission mechanism 40. It should be understood that the transmission mechanism assembly 40 may include electrical components or mechanical components such a gearbox to transmit the movement of the first tubular element 22 and the second tubular element 24 to the pressing assembly 60.

The pressing assembly 60 may include a first pressing element 62 and a second pressing element 61. The first pressing element 62 may be operated to press and securely hold a pipe. The second pressing element 61 may be operated to press and securely hold a push to connect fitting. The first pressing element 62 and the second pressing element 61 may be made of metal. The first pressing element 62 may have a pressing head 68, a first operating element 64 and a second operating element 66. The first tubular element 22 and the second tubular element 24 may be operated to transmit the plier movement to the pressing head 68 through the first operating element 64 and the second operating element 67 of the first pressing element 62. The pressing head 68 may open or close to press a pipe. The pressing head 68 may be adjusted to different sizes of pipes by means of the adjusting element 28. The first operating element 64 and the second operating element 66 of the first pressing element are connected to the transmission mechanism assembly 40. The second pressing element 64 may have a pressing head 63, a first operating element 65 and a second operating element 67. The pressing head 63 of the second pressing element 61 may have an opening which can vary in diameter to hold a push or a pipe. The first operating element 65 and the second operating element 67 of the second operating element 67 may transmit the movement of the first tubular element 22 and the second tubular element 24 to vary the diameter of the pressing head 63 and approach the first pressing element 62 and the second pressing element 61. In a preferred embodiment a user may operate the first tubular element 22 and the second tubular element 24 as pliers to approach the first pressing element 62 to the second pressing element 62. The adjusting element 28 may be operated to adjust the pressing head 63 and the pressing head 68 to fit different sizes of fitting or push.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A press to fit pipe connector tool comprising:

a handle assembly, wherein said handle includes a first tubular element, a second tubular element, wherein said first tubular element and said second tubular element include a handle portion, wherein said handle portion is in a distal end of said first tubular element and said second tubular element;

a transmission mechanism assembly, wherein said transmission mechanism assembly includes a transmission mechanism with a gearbox; and a pressing assembly including a first pressing element and a second pressing element, wherein the first pressing element is a first plier member having a plier head, a first operating element and a second operating element, wherein said first operating element and said second operating element are bar members made of metal, wherein the first operating element and the second operating element are connected to the transmission mechanism, said gearbox of the transmission mechanism transmits movement of the first tubular element and the second tubular element to the first pressing element to open the plier head, wherein the second pressing element has a second pressing head made of metal, said second pressing head has a circular opening to hold a pipe.

2. A press to fit pipe connector tool consisting of:

a handle assembly, wherein said handle includes a first tubular element, a second tubular element, wherein said first tubular element and said second tubular element include a handle portion, said handle portion is in a distal end of said first tubular element and said second tubular element;

a transmission mechanism assembly, wherein said transmission mechanism assembly includes a transmission mechanism with a gearbox; and a pressing assembly including a first pressing element and a second pressing element, wherein the first pressing element is a first plier member having a plier head, a first operating element and a second operating element, wherein said first operating element and said second operating element are bar members made of metal, wherein the first operating element and the second operating element are connected to the transmission mechanism, said gearbox of the transmission mechanism transmits movement of the first tubular element and the second tubular element to the first pressing element to open and/or close the plier head, wherein the second pressing element has a second pressing head made of metal, said second pressing head has a circular opening to hold a pipe.

* * * * *